United States Patent
Stempel et al.

(10) Patent No.: US 7,676,659 B2
(45) Date of Patent: Mar. 9, 2010

(54) SYSTEM, METHOD AND SOFTWARE TO PRELOAD INSTRUCTIONS FROM A VARIABLE-LENGTH INSTRUCTION SET WITH PROPER PRE-DECODING

(75) Inventors: Brian Michael Stempel, Raleigh, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 11/696,508

(22) Filed: Apr. 4, 2007

(65) Prior Publication Data

US 2008/0250229 A1    Oct. 9, 2008

(51) Int. Cl.
*G06F 9/312* (2006.01)
(52) U.S. Cl. .................. 712/220; 712/207
(58) Field of Classification Search .......... 712/220
See application file for complete search history.

(56) References Cited

U.S. PATENT DOCUMENTS

| | | | | |
|---|---|---|---|---|
| 5,450,605 A | * | 9/1995 | Grochowski et al. | 712/23 |
| 5,881,260 A | * | 3/1999 | Raje et al. | 712/210 |
| 6,035,387 A | * | 3/2000 | Hsu et al. | 712/210 |
| 6,049,863 A | * | 4/2000 | Tran et al. | 712/213 |
| 6,175,908 B1 | * | 1/2001 | Pickett | 712/204 |
| 6,308,257 B1 | * | 10/2001 | Theogarajan et al. | 712/210 |
| 6,460,132 B1 | | 10/2002 | Miller | |
| 6,496,921 B1 | | 12/2002 | Arimilli | |
| 6,968,430 B1 | | 11/2005 | Kashyap | |
| 2003/0005419 A1 | * | 1/2003 | Pieper et al. | 717/141 |

OTHER PUBLICATIONS

International Search Report-PCT/US08/059222, International Search Authority-European Patent Office Jul. 9, 2008.
Written Opinion-PCT/US08/059222, International Search Authority-European Patent Office Jul. 9, 2008.

* cited by examiner

*Primary Examiner*—Eric Coleman
(74) *Attorney, Agent, or Firm*—Nicholas J. Pauley; Peter Kamarchik; Sam Talpalatsky

(57) ABSTRACT

In a processor executing instructions from a variable-length instruction set, a preload instruction is operative to retrieve from memory a data block corresponding to an instruction cache line, pre-decode instructions from a variable-length instruction set in the data block, and load the instructions and pre-decode information into the instruction cache. An instruction execution unit indicates to a pre-decoder the position within the data block of a first valid instruction. The pre-decoder successively determines the length of each instruction and hence the instruction boundaries. An instruction cache line offset indicator that identifies the position of the first valid instruction may be generated and provided to the pre-decoder in a variety of ways.

24 Claims, 3 Drawing Sheets

SYSTEM, METHOD AND SOFTWARE TO PRELOAD INSTRUCTIONS FROM A VARIABLE-LENGTH INSTRUCTION SET WITH PROPER PRE-DECODING

BACKGROUND

The present invention relates generally to the field of processors and in particular to a system, method, and software for pre-loading instructions from a variable-length instruction set into an instruction cache, and correctly pre-decoding the instructions.

Microprocessors perform computational tasks in a wide variety of applications. Improved processor performance is almost always desirable, to allow for faster operation and/or increased functionality through software enhancements. By exploiting both architectural advances, such as RISC architectures, and advances in semiconductor technology, many modern processors execute at clock speeds much higher than memory chips, such as DRAM and SDRAM. To minimize the penalty of relatively slow memory accesses, these processors utilize a hierarchical memory structure, with fast, on-chip cache memories storing local copies of data and instructions that have been recently accessed and/or that the processor anticipates (via software) accessing in the near future.

One example of anticipating loads to an instruction cache is a preload instruction (e.g., the ARM instruction PLI). A preload instruction loads instructions into the instruction cache in advance of their execution. A programmer may insert a preload instruction into code somewhat ahead of a known or anticipated branch (such as a subroutine call) to a target. The preload instruction loads instructions at the target into the instruction cache, so that when the branch executes, instructions at the target are available in the cache for immediate execution.

Most modern processors employ a pipelined architecture, where sequential instructions are overlapped in execution to increase overall processor throughput. Maintaining smooth execution through the pipeline is critical to achieving high performance. One pipeline optimization technique known in the art is pre-decoding instructions. Instructions are examined as they are retrieved from memory, are partially decoded, and some information about the instructions—known as pre-decode information—is stored in an instruction cache line along with the associated instructions. When the instructions are later fetched from the cache into the pipeline, the pre-decode information is also fetched, and assists in fully decoding the instructions. Pre-decode information may, for example, identify branch and floating-point instructions, or other information useful in executing the instructions in the pipeline.

Some instruction sets include instructions having different lengths. For example, a processor may have a 32-bit native instruction set, and additionally include the ability to execute Java byte codes. As another example, several versions of the ARM processor architecture execute instructions from an instruction set known as Thumb-2. Thumb-2 instructions may be sixteen or thirty-two bits long. In general, a compiler selects Thumb-2 instructions to achieve the most compact code, and 16-bit and 32-bit instructions may be mixed in any order within a segment of Thumb-2 code. Furthermore, in general, there is no restriction on the alignment of instructions in memory.

One useful function of a pre-decoder in a variable-length instruction set processor is to ascertain and indicate the length of each instruction in an instruction cache line. That is, the pre-decode information may identify instruction boundaries, which may be determined, for example, by inspection of the instruction op codes. This information assists the pipeline fetch and decode stages upon fetching the instructions into the pipeline for execution.

One problem encountered in pre-loading instructions from a variable-length instruction set and pre-decoding the instructions to indicate instruction boundaries is that, because instructions are not necessarily aligned in memory, they may not be aligned along instruction cache line boundaries. Consequently, the first datum (e.g., halfword) in a cache line-size data block retrieved from memory may be a complete instruction (e.g., a 16-bit instruction) or part of an instruction that is continued in the same cache line (e.g., the first 16 bits of a 32-bit instruction), either of which is detected by the pre-decoder. However, the first datum may be part of an instruction that began prior to the data block (e.g., the last 16-bits of a 32-bit instruction) or may comprise non-instruction data such a variable, immediate data, or the like. In either of the latter two cases—a partial instruction or data—the first datum may be incorrectly pre-decoded as a complete instruction or the first part of an instruction.

Since the length and hence boundaries of other instructions in the data block are determined sequentially, incorrectly pre-decoding the first datum may cause all instructions in the data block to be incorrectly pre-decoded, and the incorrect pre-decode information written with the instructions to the instruction cache. When the instructions are subsequently fetched from the cache into the pipeline and the pre-decode information is determined to be erroneous, the cache line must be discarded and the instructions again fetched from memory and pre-decoded to determine the correct instruction boundaries—adversely affecting both processor performance and power consumption.

SUMMARY

According to one or more embodiments disclosed and claimed herein, in a processor executing instructions from a variable-length instruction set, a preload instruction is operative to retrieve from memory a data block corresponding to an instruction cache line, pre-decode instructions in the data block, and load the instructions and pre-decode information into the instruction cache. An instruction execution unit indicates to a pre-decoder the position within the data block of a first valid instruction. The pre-decoder successively determines the length of each instruction and hence the instruction boundaries. An instruction cache line offset indicator that identifies the position of the first valid instruction may be generated and provided to the pre-decoder in a variety of ways.

One embodiment relates to a method of pre-loading instructions from a variable-length instruction set into an instruction cache. An instruction cache line offset indicator is set, the indicator identifying the offset into a data block corresponding to an instruction cache line of a first valid instruction. A preload instruction operative to retrieve from memory a data block including at least one instruction from a variable-length instruction set and to load the instructions into the instruction cache is executed. The instructions in the data block are successively pre-decoded beginning at a first instruction, in response the instruction cache line offset indicator.

Another embodiment relates to a processor. The processor includes a memory interface and an instruction cache operative to store instructions from a variable-length instruction set and their corresponding pre-decode information. The processor also includes an instruction execution unit operative to generate an instruction cache line offset indicator identifying a first valid instruction in a data block to be loaded into the instruction cache. The processor further includes a pre-decoder interposed between the instruction cache and the memory interface and operative to successively pre-decode instructions from a variable-length instruction set in the data block beginning at a first valid instruction, in response to the instruction cache line offset indicator, upon execution of a preload instruction.

Yet another embodiment relates to a computer readable medium storing at least a preload instruction in a variable-length instruction set, the instruction operative to cause a processor to preload instructions into an instruction cache, wherein the pre-loaded instructions are pre-decoded beginning at a first valid instruction.

DETAILED DESCRIPTION

Figure 1:
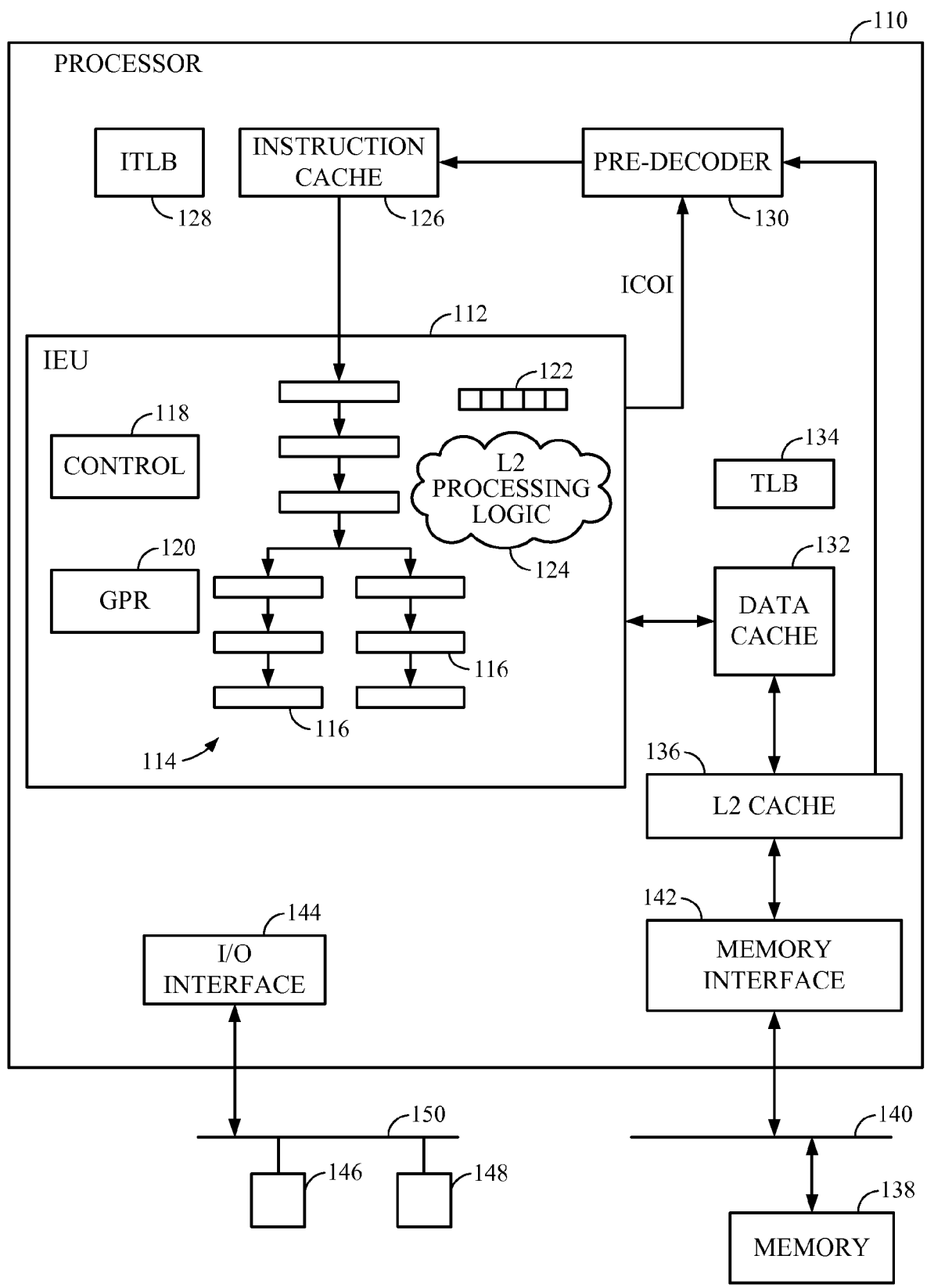
FIG. 1 is a functional block diagram of processor that correctly pre-decodes instructions pre-loaded from a variable-length instruction set.

FIG. 1 depicts a functional block diagram of a processor 110 that executes instructions from at least one variable-length instruction set. In particular, the processor 110 correctly pre-decodes instructions pre-loaded from a variable-length instruction set. The processor 110 executes instructions in an instruction execution unit 112 that includes a pipeline 114 comprising a plurality of registers or latches 116, organized in pipe stages, as well as logical and computational circuits such as Arithmetic Logic Units (ALU) (not shown). The pipeline executes instructions according to control logic 118. The pipeline 114 may be a superscalar design, as shown.

A General Purpose Register (GPR) file 120 provides registers comprising the top of a memory hierarchy. In one embodiment, the instruction execution unit also includes a status register 122 that may indicate the offset into an instruction cache line at which a first instruction is located, as further explained herein. The instruction execution unit 112 also includes L2 processing logic 124 that tracks properties of instructions and data fetched from an L2 cache memory 136 or main memory 138.

The pipeline 114 fetches instructions from an instruction cache 126, with memory addressing and permissions managed by an Instruction-side Translation Lookaside Buffer (ITLB) 128. A pre-decoder 130 pre-decodes instructions fetched from the L2 cache 136 (or main memory 138) and places the instructions and pre-decode information into the instruction cache 126. In one or more embodiments, the pre-decode information includes the length of the instructions in an instruction cache line. As discussed in greater detail herein, the pre-decoder 130 correctly determines the length of instructions in response to an instruction cache line offset indicator (ICOI) from the instruction execution unit 112 that identifies the position within a cache line of a first instruction.

Data is accessed from a data cache 132, with memory addressing and permissions managed by a main Translation Lookaside Buffer (TLB) 134. In various embodiments, the ITLB 128 may comprise a copy of part of the TLB 134. Alternatively, the ITLB 128 and TLB 134 may be integrated. Similarly, in various embodiments of the processor 110, the instruction cache 126 and data cache 132 may be unified.

Misses in the instruction cache 126 and data cache 132 cause an access to Level-2 (L2) cache memory 136 which, in the embodiment depicted in FIG. 1, is integrated. Misses in the L2 cache 136 cause an access to main (off-chip) memory 138 over a system bus 140, under the control of a memory interface 142. The processor 110 may include an Input/Output (I/O) interface 144, controlling access to various peripheral devices 146, 148 across a peripheral bus 150. As well known in the art, the processor 110 executes instructions retrieved from a computer readable medium, such as memory 136, or magnetic or optical media read by a peripheral 146, 148.

Those of skill in the art will recognize that numerous variations of the processor 110 are possible. For example, the processor 110 may include a Level-3 (L3) or additional cache, and/or a separate L2 cache 136 may be dedicated to each of the instruction and data caches 126, 132. In addition, one or more of the functional blocks depicted in the processor 110 may be omitted from a particular embodiment.

The processor 110 executes instructions from at least one variable-length instruction set. In various embodiments, the processor 110 may execute instructions from both a fixed-length instruction set (e.g., the 32-bit ARM instruction set) and one or more variable-length instruction sets (e.g., the 32-bit and 16-bit Thumb-2 instruction set), or from two or more variable-length instruction sets. In these embodiments, the current processor instruction set mode may be indicated by one or more bits in a register, such as the status register 122. In another embodiment, the processor 110 executes instructions only from a single, variable-length instruction set.

A variable-length instruction set executed by the processor 110 includes at least one preload instruction operative to load instructions into the instruction cache 126 in advance of the instructions' execution. The preload instruction retrieves from the L2 cache 136 or memory 138 an instruction cache line-sized block of data containing one or more instructions. The data block is pre-decoded by the pre-decoder 130 to determine instruction lengths and other pre-decode information. The instructions and the pre-decode information are then written to the instruction cache 126.

Figure 2:
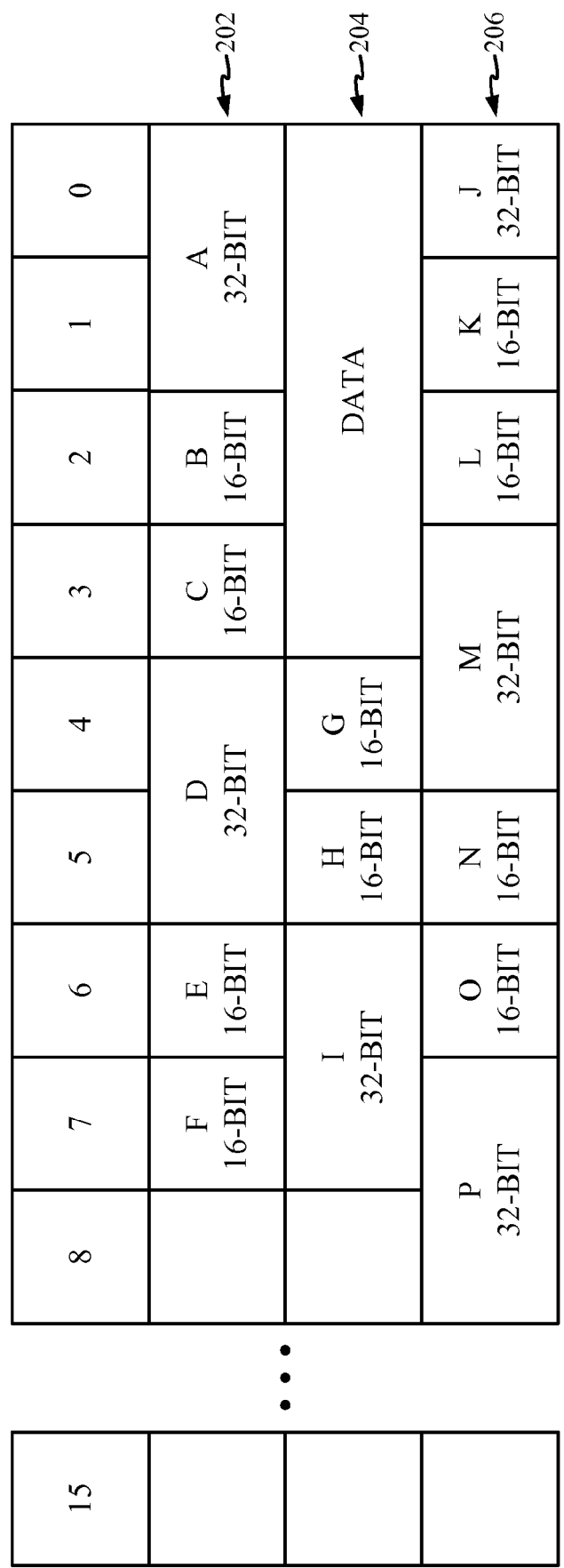
FIG. 2 is a block diagram depicting the alignment of instructions from a variable-length instruction set in three representative data blocks.

FIG. 2 depicts several possible distributions of data and instructions in data blocks pre-loaded into a cache line by a preload instruction in a variable-length instruction set. In the embodiment depicted in FIG. 2, the cache line is sixteen halfwords. For clarity, only the lower half of the data blocks are shown in detail. The processor 110 in the embodiment depicted in FIG. 2 executes instructions from an instruction set having both 16-bit and 32-bit instructions (e.g., Thumb-2). A first hypothetical data block 202 to be pre-loaded into a cache line begins with instruction A, a 32-bit instruction, followed by 16-bit instructions B and C, a 32-bit instruction D, and 16-bit instructions E and F. The pre-decoder 130 inspects an instruction length indicator associated with instruction A and determines that it is a 32-bit instruction. In one embodiment, the instruction length indicator is a bit field of the instruction op code. For example, in the Thumb-2 instruction set, if bits [15:11] have the value 'b11101, 'b11110, or 'b11111, the instruction is thirty-two bits long; any other encoding indicates a 16-bit instruction.

Having determined that the instruction occupying half-word 0 is a 32-bit instruction (occupying the halfwords 0 and 1), the pre-decoder 130 inspects the bit pattern at halfword 2 and determines that instruction B is sixteen bits in length. In this manner, the pre-decoder 130 works successively down the pre-loaded data block, determining the length of each instruction and hence the starting position of the next instruction. The instruction length, along with other pre-decode information, is written into the instruction cache 126. The data block 202 is properly pre-decoded because instruction A was aligned at the beginning of the data block 202.

A preload instruction retrieves a fixed-sized block of data 202, 204, 206—equal to the size of an instruction cache line—from the L2 cache 136 or memory 138. In most implementations, the data blocks 202, 204, 206 are aligned in memory by masking off the least significant n address bits, where the cache line size is $2^n$ bytes. A preload instruction having a target address of a specific, individual instruction retrieves from memory the aligned data block 202, 204, 206 that includes the target instruction, not a block of memory beginning with the target instruction (unless the target instruction happens to be the first instruction in a data block 202, 204, 206, such as instruction A in FIG. 2). Accordingly, the first datum (e.g., halfword) of a data block 202, 204, 206 retrieved from memory by a preload instruction is not necessarily an instruction or the beginning of an instruction.

For example, the data block 204 includes non-instruction data in positions corresponding to halfwords 0-3. Since this data may include any bit pattern, it may be erroneously pre-decoded as instructions. For example, a conventional pre-decoder may interpret the data as a 16-bit instruction at halfword 0, a 32-bit instruction at halfwords 1-2, and another 32-bit instruction at halfwords 3-4. In this case, the pre-decode information regarding the halfword position containing instruction G is erroneous.

As another example, the data block 206 begins with the second half of instruction J, the first 16 bits of which are in another data block. However, a conventional pre-decoder may interpret instruction J as a 32-bit instruction occupying halfwords 0-1, and consequently skip over instruction K. If the data blocks 204, 206 and their corresponding, erroneous pre-decode information are written to an instruction cache when the relevant instructions are later fetched from to the instruction cache into a pipeline, the instructions must be discarded and re-fetched to obtain correct pre-decode information. This adversely affects processor performance, as a pipeline must stall to await the L2 cache 136 or memory 138 access. Power consumption is also increased, as the same data block 204, 206 must be retrieved and pre-decoded twice.

To allow the pre-loading of instructions from a variable-length instruction set with correct pre-decoding, the instruction execution unit 112 generates an instruction cache line offset indicator (ICOI) identifying the position within a data block 202, 204, 206 of a first valid instruction or the beginning of a first valid instruction. The instruction execution unit 112 provides the ICOI to the pre-decoder 130 upon executing a preload instruction. The bit size of the ICOI depends on the size of an instruction cache line and the shortest instruction in the instruction set. In the embodiment depicted in FIG. 2, for example, the shortest instruction is 16 bits, or a halfword, and an instruction cache line includes sixteen halfwords. Accordingly, an ICOI in this embodiment requires four bits. In general, the ICOI comprises m bits, where the line size of the instruction cache 126 is $2^m$ times the shortest instruction. The ICOI may be generated and communicated to the pre-decoder 130 in a variety of ways.

In one embodiment, one or more unused address bits of the preload instruction target address are encoded as the ICOI. A preload instruction (e.g., PLI) takes the address of a target instruction as an operand. The target instruction address may be decomposed into, for example, a tag, a set number, and a cache line index. For example, for a 32-bit instruction virtual address VA[31:0], the tag, which is compared against tags stored in a CAM structure of the instruction cache 126, may comprise VA[31:11]. In a p-way set associative cache, the set number selects from among p results returned if the tag matches. The set number may comprise VA[10:5]. The index, VA[4:0], addresses individual bytes of the cache line, i.e. the data that are stored in a RAM structure of the instruction cache 126. The data comprise instructions and pre-decode information.

According to one embodiment, some or all of the cache line index, e.g., VA[4:0], is used to encode the instruction cache line offset indicator (ICOI). In the embodiment depicted in FIG. 2, only four of the five index bits VA[4:0] are required for the ICOI. In one embodiment, the preload target instruction address bits VA[4:1] may hold the ICOI, leaving VA[0] free for use as another flag (such as, for example, to select between two different instruction set encodings for performing the pre-decoding operations). If the instruction set included 8-bit instructions, the entire cache line index VA[4:0] would be required to store the ICOI.

The ICOI is encoded into the cache line index portion of a preload target address when the address is determined and written to a compiler-specified GPR in preparation for the execution of an associated preload instruction. When the preload instruction executes, it reads a target instruction address from the specified GPR register. If the target address hits in the instruction cache 126, the preload instruction execution is complete. If the target address misses in the instruction cache 126, logic within the instruction execution unit 112, such as L2 processing logic 124, performs miss processing, accessing the L2 cache 136 and, if necessary, main memory 138 to retrieve a block of data such as data blocks 202, 204, 206 that includes the target instruction(s). The data blocks 202, 204, 206 are pre-decoded to determine, among other information, the length of each valid instruction in the block 202, 204, 206.

When a block of data 202, 204, 206 containing instructions is loaded into the pre-decoder 130, the L2 processing logic 124 presents the ICOI to the pre-decoder 130. In response to the ICOI, the pre-decoder 130 pre-decodes instructions beginning at the offset specified by the ICOI, which corresponds to the location of a first valid instruction or the start of a first valid instruction. In the embodiment of FIG. 2, the ICOI would be 'b0000 for data block 202, 'b0100 for data block 204, and 'b0001 for data block 206.

The pre-decoder 130 determines the length of the first instruction (and other pre-decode information), such as by inspecting the instruction op code, and determines from the length of the first instruction the start of the second instruction. The pre-decoder 130 then determines the length of the second instruction, and so on until the length (and other pre-decode information) of every instruction in the data block 202, 204, 206 has been determined. The pre-decoder 130 then writes the instructions, along with the correct pre-decode information, to the instruction cache 126. In one embodiment, the pre-decoder 130 additionally speculatively pre-decodes the data preceding the first valid instruction, as indicated by the ICOI, on the chance that the data may include one or more instructions.

In one embodiment, the instruction cache line offset indicator (ICOI) comprises a bit field in a register, such as the status register 122. In this embodiment, the ICOI bits are explicitly set prior to execution of a preload instruction. Upon execution of the preload instruction, the pre-decoder 130 inspects the ICOI bits in the status register 122 or other register, and correctly pre-decodes the data block 202, 204, 206 beginning at the indicated first valid instruction. The instructions and pre-decode information are then written to the instruction cache 126.

In one embodiment, the instruction cache line offset indicator (ICOI) comprises one or more bits in the op code of the preload instruction. A bit field of the preload instruction op code may be defined for the ICOI, and a compiler may set the ICOI bit field according to a programmer's instructions or directives in code. Upon execution of the preload instruction, the ICOI bit field is presented to the pre-decoder 130, such as by the L2 processing logic 124, and the pre-decoder 130 pre-decodes the data block 202, 204, 206 beginning at the indicated first valid instruction. The instructions and pre-decode information are then written to the instruction cache 126.

In one embodiment, the variable-length instruction set includes a plurality of preload instructions, each specifying a different instruction cache line offset indicator (ICOI). For example, in the embodiment depicted in FIG. 2, sixteen different preload instructions each specify a different ICOI for pre-decoding instructions in the data block 202, 204, 206. A programmer or compiler may specify the proper preload instruction for a known offset into a pre-loaded data block 202, 204, 206, based on known memory alignments and the address of a first instruction to be pre-decoded.

Those of skill in the art will recognize that the above-described embodiments are not mutually exclusive. For example, a preload instruction having an ICOI bit field in the op code may, in particular implementations, present the ICOI to the pre-decoder 130 by latching the ICOI into a register such as the status register 122, or by substituting the ICOI into one or more unused address bits in the preload target address. In general, given the teachings of the present disclosure, those of skill in the art may ascertain the best solution for communicating to the pre-decoder 130 the offset into a data block 202, 204, 206 at which a first valid instruction is located.

Figure 3:
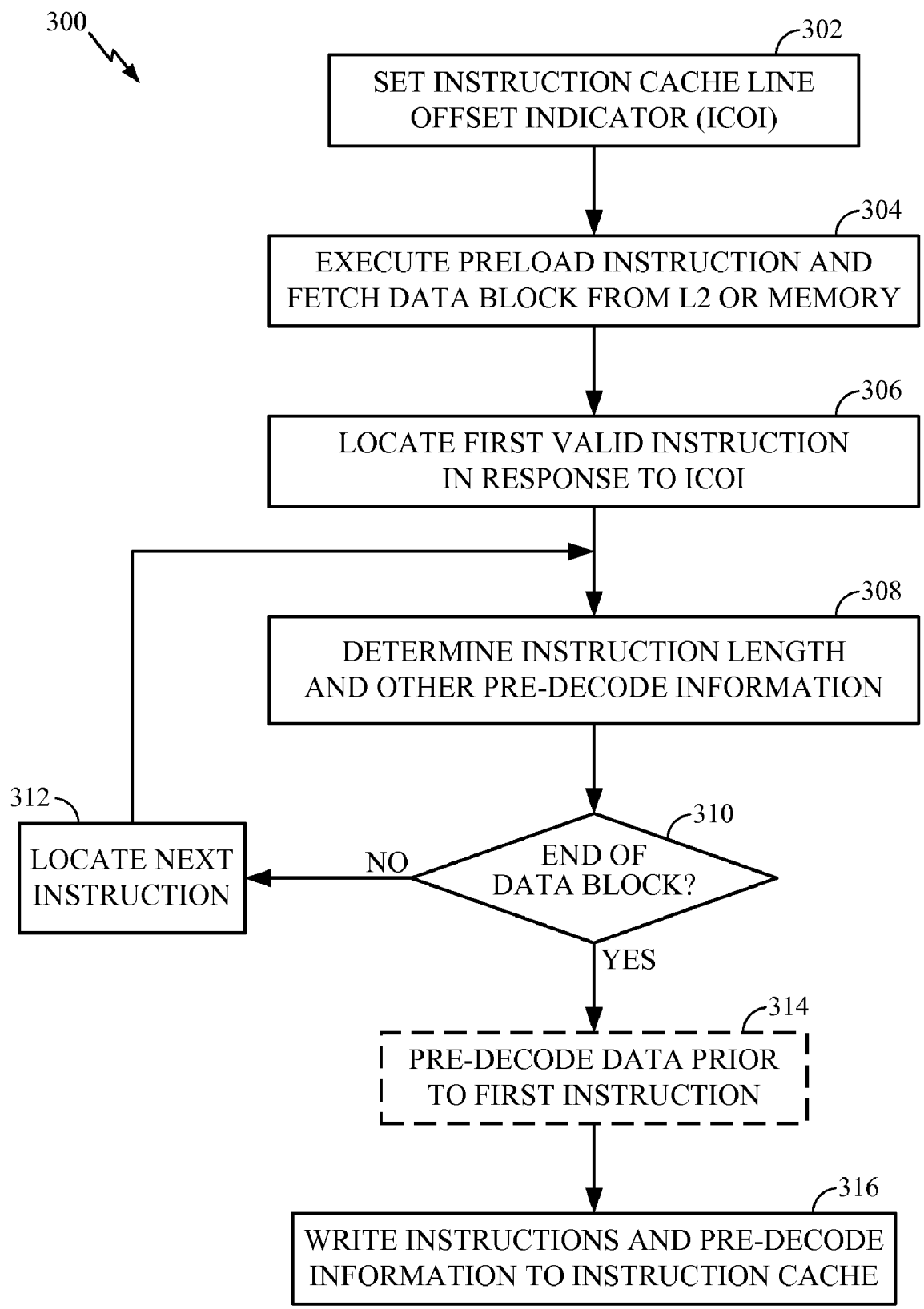
FIG. 3 is a flow diagram of a method of pre-loading instructions from a variable-length instruction set.

FIG. 3 depicts a method 300 of pre-loading instructions. The method begins by setting an instruction cache line offset indicator (ICOI) (block 302). The ICOI identifies the location of a first valid instruction within a cache line or data block 202, 204, 206. In various embodiments, the ICOI may be set by altering a preload instruction target address, setting ICOI bits in a register such as the status register 122, or setting an ICOI bit field in a preload instruction op code.

A preload instruction is executed (block 304). The preload instruction is operative to retrieve a data block 202, 204, 206 containing at least a target instruction from the L2 cache 136 or memory 138, and provide the data block 202, 204, 206 to the pre-decoder 130. In response to the ICOI, the pre-decoder 130 locates the first valid instruction in the data block 202, 204, 206 (block 306), and determines the length of the first instruction (block 308). If it has not reached the end of the data block 202, 204, 206 (block 310), the pre-decoder 130 uses the instruction length determined in block 308 to determine the start of another instruction (block 312), and inspects that instruction to determine its length (block 308). This process continues until the end of the data block 202, 204, 206 is reached (block 310).

In one embodiment, the pre-decoder 130 may pre-decode the data preceding the first instruction (block 314). If the data is random data (as depicted in data block 204) or the continuation of an instruction (as depicted in data block 206), the pre-decode information generated will likely be erroneous. However, if the data preceding the first instruction comprises valid instructions that are aligned with the start of the data block 202, 204, 206, the pre-decode information will be correct, and may assist the pipeline 114. In other embodiments, data preceding the first instruction is not pre-decoded.

The pre-decoder 130 writes the instructions and pre-decode information to the instruction cache 126 (block 316). Those of skill in the art will readily recognize that some the method steps may be performed in a different order than depicted in FIG. 3. For example, the data prior to the first instruction may be pre-decoded (block 314) prior to pre-decoding valid instructions. Additionally, the pre-decoder 130 may write instructions and pre-decode information to the instruction cache 126 (block 316) progressively, as each instruction in the data block 202, 204, 206 is pre-decoded.

According to one or more embodiments described and claimed herein, a processor 110 may preload instructions into an instruction cache 126 from a variable-length instruction set, and correctly pre-decode the instructions when an instruction or the start of an instruction is not aligned with the beginning of an instruction cache line. This may avoid the performance and power consumption degradation suffered when incorrectly pre-decoded instructions are fetched from the instruction cache 126 and must be discarded, re-fetched, and re-pre-decoded. The communication to the pre-decoder 130 of an instruction cache line offset indicator (ICOI) identifying a first valid instruction may be implemented in a variety of ways.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of pre-loading instructions from a variable-length instruction set into an instruction cache, comprising:
    setting an instruction cache line offset indicator identifying the offset, into a data block corresponding to an instruction cache line, of a first valid instruction;
    executing a preload instruction operative to retrieve from memory a data block including at least one instruction from a variable-length instruction set and to load the instructions into the instruction cache; and
    successively pre-decoding the instructions in the data block beginning at a first instruction, in response to the instruction cache line offset indicator; and
    writing the instructions and pre-decode information to the instruction cache.

2. The method of claim 1 further comprising determining the instruction boundaries of subsequent instructions in the data block based on instruction length indicators.

3. The method of claim 2 wherein an instruction length indicator comprises a bit field of an instruction op code.

4. The method of claim 1 wherein the instruction cache line offset indicator comprises a plurality of bits of a target address of the preload instruction.

5. The method of claim 4 wherein the instruction cache line offset indicator comprises target address bits [4:1].

6. The method of claim 1 wherein the instruction cache line offset indicator comprises one or more bits in the op code of the preload instruction.

7. The method of claim 1 wherein setting an instruction cache line offset indicator and executing a preload instruction comprise executing one of a plurality of preload instructions, each preload instruction including a different instruction cache line offset indicator.

8. The method of claim 7 wherein the plurality of preload instructions includes a preload instruction corresponding to each possible instruction offset into the data block.

9. The method of claim 1 wherein setting an instruction cache line offset indicator comprises setting one or more bits in a register prior to executing the preload instruction.

10. The method of claim 1 further comprising pre-decoding any data in the data block prior to the first valid instruction as indicated by the instruction cache line offset indicator.

11. The method of claim 1 wherein writing the pre-decode information comprises writing the pre-decode information indicating at least instruction length to the instruction cache.

12. A processor, comprising:
- a memory interface;
- an instruction cache operative to store instructions from a variable-length instruction set and pre-decode information;
- an instruction execution unit operative to generate an instruction cache line offset indicator identifying the position of a first valid instruction in a data block to be loaded into the instruction cache; and
- a pre-decoder interposed between the instruction cache and the memory interface and operative to successively pre-decode instructions in the data block beginning at a first valid instruction, in response to the instruction cache line offset indicator, upon execution of a preload instruction.

13. The processor of claim 12 wherein the instruction execution unit generates the instruction cache line offset indicator by setting one or more bits of a target address of the preload instruction.

14. The processor of claim 13 wherein the target address is written to a general purpose register that is read by the preload instruction.

15. The processor of claim 12 wherein the instruction execution unit generates the instruction cache line offset indicator in response to one or more bits in the op code of the preload instruction.

16. The processor of claim 12 wherein the instruction execution unit executes one of a plurality of preload instructions, each preload instruction specifying a different instruction cache line offset indicator.

17. The processor of claim 16 wherein the plurality of preload instructions includes a preload instruction corresponding to each possible instruction offset into the data block.

18. The processor of claim 12 further comprising a register, and wherein the instruction execution unit generates the instruction cache line offset indicator by setting one or more predetermined bits in the register.

19. The processor of claim 12 further comprising a second cache memory interposed between the instruction cache and the memory interface and wherein the pre-decoder is interposed between the instruction cache and the second cache memory.

20. The processor of claim 12 wherein the pre-decoder is further operative to pre-decode any data in the data block prior to the first valid instruction indicated by the instruction cache line offset indicator.

21. A computer readable medium storing at least a preload instruction in a variable-length instruction set, the instruction operative to cause a processor to preload instructions into an instruction cache, wherein the instructions are pre-decoded beginning at a first valid instruction specified by an instruction cache line offset indicator.

22. The computer readable medium of claim 21 wherein the instruction cache line offset indicator comprises one or more bits of a target address of the preload instructions.

23. The computer readable medium of claim 21 wherein the preload instruction op code includes an instruction cache line offset indicator bit field.

24. The computer readable medium of claim 21 wherein the instruction cache line offset indicator is stored to a register prior to execution of the preload instruction.

* * * * *

UNITED STATES PATENT AND TRADEMARK OFFICE
CERTIFICATE OF CORRECTION

| | | |
|---|---|---|
| PATENT NO. | : 7,676,659 B2 | Page 1 of 1 |
| APPLICATION NO. | : 11/696508 | |
| DATED | : March 9, 2010 | |
| INVENTOR(S) | : Stempel et al. | |

It is certified that error appears in the above-identified patent and that said Letters Patent is hereby corrected as shown below:

Column 8, line 55, claim 3: "an instruction" to read as --the instruction--

Signed and Sealed this
Seventh Day of June, 2011

David J. Kappos
*Director of the United States Patent and Trademark Office*